(12) United States Patent
Mareaux

(10) Patent No.: US 11,242,707 B2
(45) Date of Patent: Feb. 8, 2022

(54) SYSTEM FOR GUIDING AND SUPPORTING A LEAF OF A PLATFORM-ACCESS DOOR

(71) Applicant: Faiveley Transport Tours, Saint-Pierre-des-Corps (FR)

(72) Inventor: Sebastien Mareaux, Tours (FR)

(73) Assignee: Faiveley Transport Tour, Saint-Pierre des-Corps (FR)

( * ) Notice: Subject to any disclaimer, the term of this patent is extended or adjusted under 35 U.S.C. 154(b) by 442 days.

(21) Appl. No.: 15/746,696

(22) PCT Filed: Jul. 29, 2016

(86) PCT No.: PCT/FR2016/051995
§ 371 (c)(1),
(2) Date: Jan. 22, 2018

(87) PCT Pub. No.: WO2017/021643
PCT Pub. Date: Feb. 9, 2017

(65) Prior Publication Data
US 2018/0216394 A1    Aug. 2, 2018

(30) Foreign Application Priority Data
Jul. 31, 2015 (FR) .................................. 1557442

(51) Int. Cl.
*E05F 15/643*    (2015.01)
*E05D 15/06*    (2006.01)
*B61B 1/02*    (2006.01)

(52) U.S. Cl.
CPC .............. *E05F 15/643* (2015.01); *B61B 1/02* (2013.01); *E05D 15/0617* (2013.01);
(Continued)

(58) Field of Classification Search
CPC .... E05F 15/643; E05F 15/646; E05D 15/066; E05D 15/0617; B61B 1/02; E05Y 2900/404
See application file for complete search history.

(56) References Cited

U.S. PATENT DOCUMENTS 2,905,463 A * 9/1959 Borden .................. E05F 15/643
 49/360
4,991,347 A * 2/1991 Takimoto ................ E05D 15/06
 49/40
(Continued)

FOREIGN PATENT DOCUMENTS

| CN | 203361842 U | 12/2013 |
|---|---|---|
| DE | 44 41 152 | 12/1995 |

(Continued)

OTHER PUBLICATIONS

Machine translation of WO 2011/152278 (Year: 2011).*
(Continued)

*Primary Examiner* — Gregory J Strimbu
(74) *Attorney, Agent, or Firm* — The Small Patent Law Group LLC; Mary D. Lawlor

(57) ABSTRACT

A system for guiding and supporting a leaf of a platform-access door capable of moving relative to a fixed panel in a horizontal translational movement in a plane of the leaf between open and closed positions, includes a rail extending in a direction of the horizontal translational movement, a first set of rollers collaborating with the rail with and being made up of: a main roller in contact with a lower bearing surface of the rail; first and second secondary rollers which are vertically offset from one another and are respectively in contact with the lower bearing surface and with an upper bearing surface of the rail and are spaced from the main roller.

11 Claims, 8 Drawing Sheets

(52) U.S. Cl.
CPC ...... *E05D 15/0686* (2013.01); *E05Y 2201/64* (2013.01); *E05Y 2201/644* (2013.01); *E05Y 2201/684* (2013.01); *E05Y 2201/688* (2013.01); *E05Y 2800/268* (2013.01); *E05Y 2900/402* (2013.01); *E05Y 2900/404* (2013.01)

(56) References Cited

U.S. PATENT DOCUMENTS

| | | | |
|---|---|---|---|
| 6,536,077 | B1 | 3/2003 | Epsey |
| 8,196,353 | B2 * | 6/2012 | Loidolt ............... E05D 15/0617 49/404 |
| 8,443,549 | B2 * | 5/2013 | Salvietti ................. E05D 15/48 49/118 |
| 8,931,213 | B2 * | 1/2015 | Loidolt ............... E05D 15/0617 49/404 |
| 2008/0190031 | A1 * | 8/2008 | Winkelmann ...... E05D 15/0617 49/427 |
| 2009/0320373 | A1 * | 12/2009 | Payne ................. E05D 15/0617 49/50 |
| 2012/0031006 | A1 * | 2/2012 | Katagata ............. E05D 15/0617 49/360 |

FOREIGN PATENT DOCUMENTS

| | | |
|---|---|---|
| EP | 1 016 769 | 7/2000 |
| FR | 2 903 137 | 1/2008 |
| JP | 2010 105547 | 5/2010 |
| WO | WO 2011/152278 | * 12/2011 |

OTHER PUBLICATIONS

International Search Report dated Oct. 28, 2016 (6 pages including English translation) from PCT Priority Application No. PCT/FR2016/051995.

* cited by examiner

SYSTEM FOR GUIDING AND SUPPORTING A LEAF OF A PLATFORM-ACCESS DOOR

This application claims priority to International Application No. PCT Application No. PCT/FR2016/051995 filed Jul. 29, 2016; and French Patent Application No. 1557442 filed Jul. 31, 2015; the entire contents of each are incorporated herein by reference.

The invention relates to a guiding and support system for a leaf of a platform screen door, and to a platform screen door equipped with such a guiding and support system.

The platform facades make it possible to isolate the platform deck as such from the traffic line along which the platform extends, when there is no traffic on said traffic line. However, when a train, e.g. a rapid transit train, is parked at the platform along the platform, the platform facade must allow the users access to the cars of the parked train. For that, the platform facade comprises a series of screen doors arranged so as to extend facing access doors of the train likely to be parked along the platform. As is known per se, a platform screen door forms a module which comprises at least one fixed part and an associated sliding leaf which can be moved between an open position and a closed position (and vice versa) in a horizontal direction in the plane of the leaf and substantially parallel to a platform edge coping on which the screen door is positioned. In open position, the leaf at least partly frees an opening allowing passage for the users adjacent to the fixed part of the screen door. In closed position, the leaf blocks this opening. For that, a guiding and support system is provided between the fixed part and the associated sliding leaf, together with a motor drive to move the sliding leaf in its translational movements between the open and closed positions.

Generally, the platform screen doors comprise two pairs of fixed part/sliding leaf positioned symmetrically in mirror-fashion. The two fixed parts are separated from one another by a door threshold, the assembly delimiting the opening allowing passage for the users. The two sliding leaves can then be moved according to horizontal translational movements in the plane of the leaves which are symmetrical to one another between the closed position and the open position and vice versa. Each of the sliding leaves has a guiding and support system and an associated motor drive.

Also, the standards imposed for the platform screen doors require the provision of at least one guiding and support system which allows:

a resistance to the pumping effect induced by the passage of a train on the traffic line along the platform facade, therefore along the screen door equipped with the guiding and support system;

a resistance to wind;

a resistance to possible thrust induced by the users that may be located on the platform deck;

a support for the weight of the sliding leaf linking the guiding and support system to the associated fixed part.

Such guiding and support systems are illustrated for example in the document JP 2010-105547. It emerges that such guiding systems require numerous moving parts or parts rubbing against one another. This increases the complexity of the maintenance interventions and increases the risks of failure. This then involves a high manufacturing and servicing cost.

One aim of the invention is to provide a guiding and support system for a sliding leaf of a platform screen door which is simpler and less costly to produce and to service.

To this end, according to the invention, a guiding and support system is provided for a leaf of a platform screen door, the leaf being able to be moved in relation to a fixed panel by a horizontal translational movement in a plane of the leaf between open and closed positions in which the leaf at least partly frees or blocks an opening adjacent to the fixed panel, comprising:

a rail extending in a direction of the horizontal translational movement a first set of rollers cooperating with the rail to guide it and support it in the horizontal translational movement, each roller of the set of rollers comprising an axis of rotation at right angles to the plane of the leaf, the first set of rollers consisting:

of a main roller in contact with a bottom bearing surface of the rail, of first and second secondary rollers offset relative to one another in at least one vertical direction and in contact respectively with the bottom bearing surface of the rail and a top bearing surface of the rail, the first and second secondary rollers being positioned at a distance from the main roller in the direction of the horizontal translational movement and in the direction of a transition from the closed position to the open position.

Advantageously, but optionally, the guiding and support system according to the invention offers at least one of the following additional technical features:

the second secondary roller is situated between the main roller and the first secondary roller;

the second secondary roller is offset in the direction of the horizontal translational movement in relation to the first secondary roller;

the system comprises a second set of rollers intended to laterally guide the rail in a horizontal direction at right angles to the direction of the horizontal translational movement;

the second set of rollers comprises a first pair of rollers positioned at the level of one out of the main roller and one of the secondary rollers;

the second set comprises a second pair of rollers positioned at the level of the other out of the main roller and one of the secondary rollers;

the first set of rollers comprises an additional roller in contact with the top bearing surface of the rail and positioned vertically to the main roller;

the main roller comprises two rollers positioned one behind the other in the direction of the horizontal translational movement;

the bottom and top bearing surfaces comprise rolling tracks inscribed in a circle so as to form a pivot function between the rail and the first set of rollers; and the rollers of the first set of rollers are mounted to be translationally mobile on their axis against elastic limiting means, the elastic limiting means forming calibrated springs.

According to the invention, there is also provided a platform screen door comprising a threshold, a first fixed panel and a first leaf that can be moved in relation to the first fixed panel by a horizontal translational movement in a plane of the leaf between open and closed positions in which the first leaf at least partly frees or blocks an opening adjacent to the first fixed panel, as well as a guiding and support system for the first leaf having at least one of the preceding technical features.

Advantageously, but optionally, the screen door according to the invention has at least one of the following additional technical features:

the rail is secured to the first leaf and the first set of rollers is secured to the first fixed panel;

the guiding and support system is situated in a bottom part of the screen door;

the screen door comprises:
- a second fixed panel, separated from the first fixed panel by the opening and the threshold;
- a second leaf that can be moved in relation to the second fixed panel by a horizontal translational movement in a plane of the leaf between open and closed positions in which the second leaf partly frees or blocks the opening, the horizontal translational movement of the second leaf being symmetrical to the horizontal translational movement of the first leaf; and
- a guiding and support system for the second leaf having at least one of the preceding technical features;

the screen door comprises a driving mechanism for the leaves comprising a driving motor, two flexible elongate driving elements fixed crosswise, the driving motor driving just one of the two flexible elongate driving elements, one of the flexible elongate driving elements comprising two ends fixed respectively to a left end of the rail of the guiding and support system for the first and second leaves and the other of the flexible elongate driving elements comprising two ends fixed respectively to a right end of the rail of the guiding and support system for the first and second leaves;

the flexible elongate driving elements run partly in or under the threshold;

the flexible elongate driving elements are belts, chains or cables;

the driving motor is situated in the bottom part of one out of the first and second fixed panels; and the driving motor is positioned under the rail of the guiding and support system for one out of the first and second fixed panels.

Other features and advantages of the invention will become apparent from the following description of an embodiment. In the attached drawings.

Figure 1:
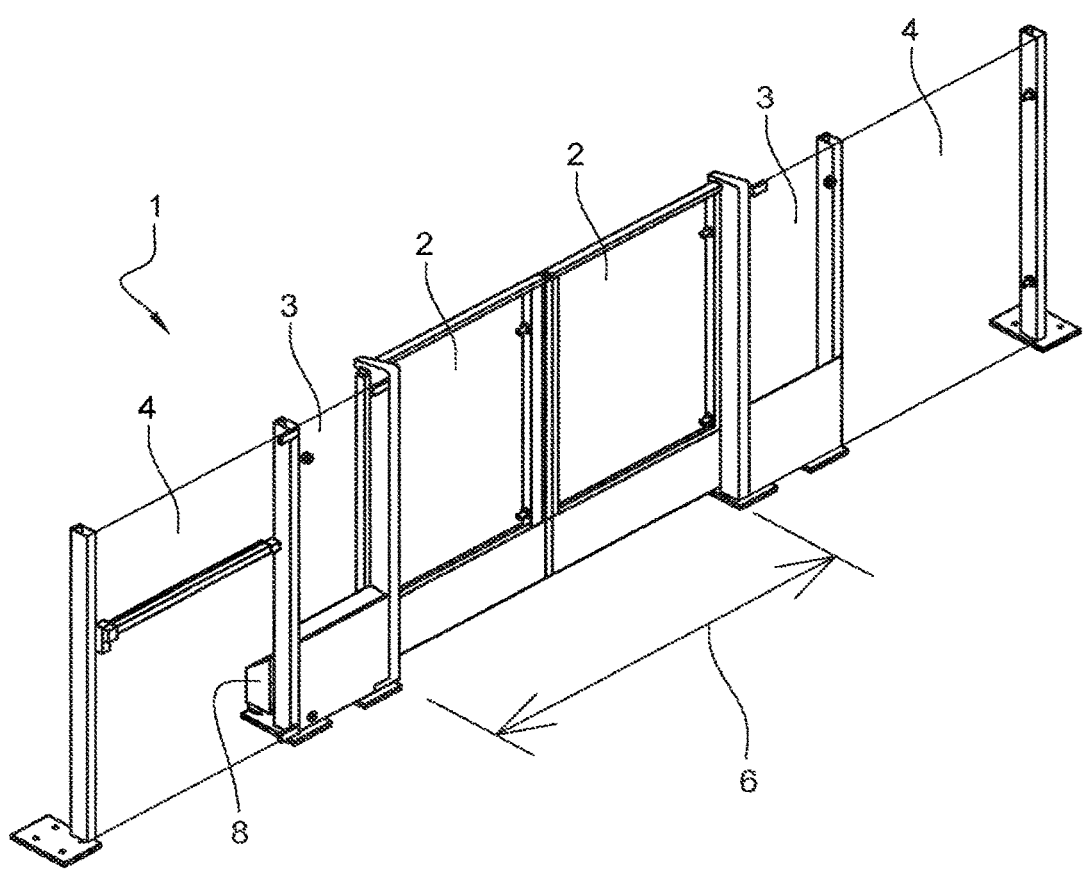
FIG. 1 is a three-dimensional view of a platform screen door module.

Referring to FIG. 1, as has been indicated in the preamble to this description, a screen door 1 comprises, here, from one end to the other, a first emergency door 4, a first fixed part 3, a first sliding leaf 2 associated with the first fixed part 3, a second sliding leaf 2, a second fixed part 3 associated with the second sliding leaf 2, and a second emergency door 4. In a variant embodiment, the first and second emergency doors 4 can be fixed panels. A door threshold 6 separates the two fixed parts 3 from one another and delimits with it an opening adjacent to the fixed access parts 3. The first and second sliding leaves are mounted to be horizontally translationally mobile in the plane of the sliding leaf over the fixed part 3 which is associated with them via a guiding and support system 8 according to the invention. Thus, each sliding leaf can assume a closed position in which it at least partly blocks the adjacent opening and an open position in which it at least partly frees the abovementioned adjacent opening. In addition, the two sliding leaves are driven by symmetrical and, preferably, synchronized translational movements.

It should be noted that the guiding and support system 8 according to the invention is positioned, here, in the bottom part of the screen door, and therefore of the fixed part 3 and of the sliding leaf 2 that it links. In addition, as will be seen later, the motor drive mechanism of the sliding leaves 2 is itself also situated in this bottom part. In a variant embodiment, the guiding and support system 8 and/or the motor drive mechanism can be situated in any part of the screen door and therefore of the fixed part 3 and of the associated sliding leaf 2.

Figure 2:
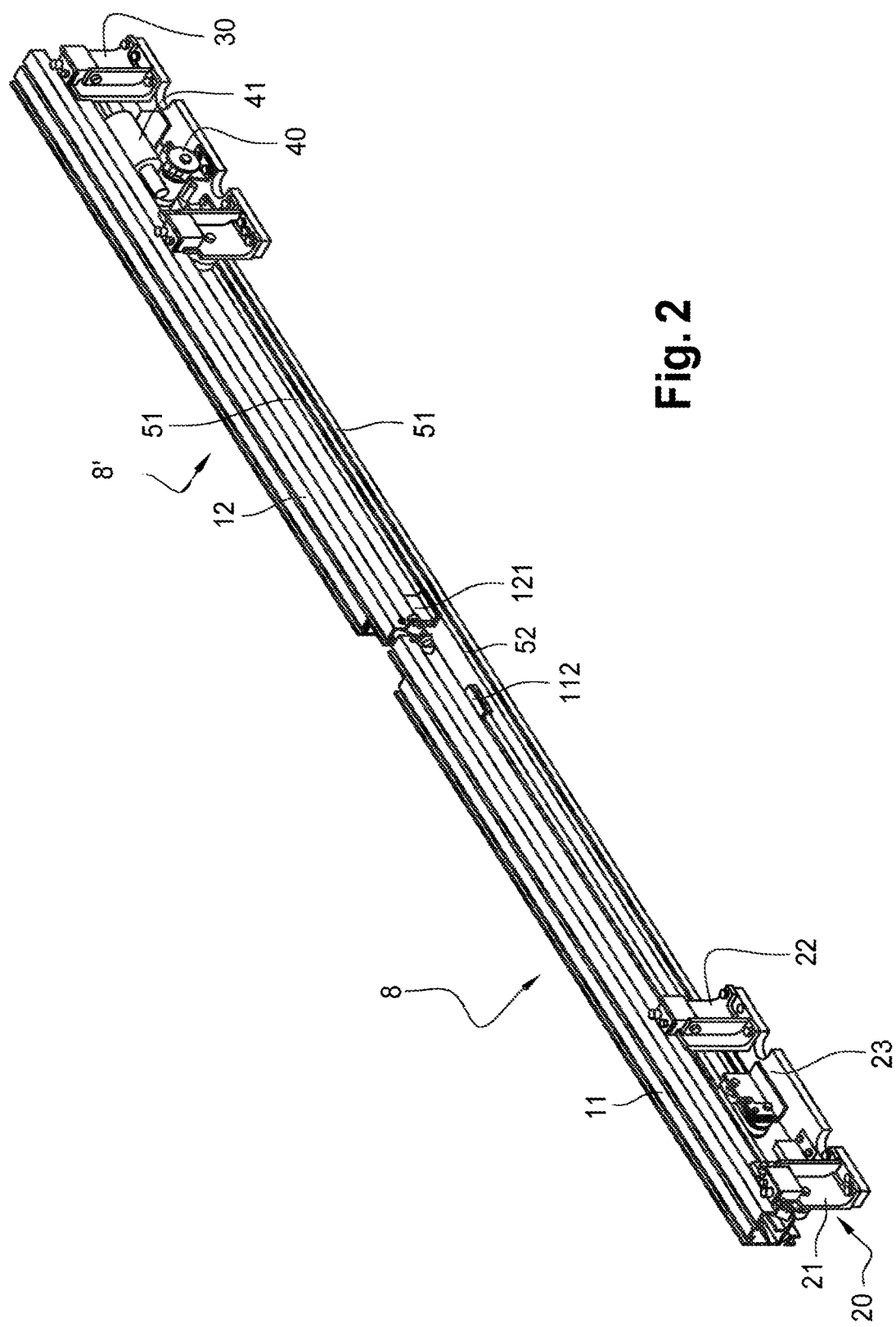
FIG. 2 is a three-dimensional view of a guiding and support system according to the invention for the screen door of FIG. 1, as well as a motor drive mechanism.

Referring now to FIG. 2, there now follows a more detailed description of the guiding and support system 8, 8' according to the invention. Here, the first guiding and support system 8 according to the invention allows the first sliding leaf 2 to be mounted on the first fixed part 3 of the screen door 1 and the second guiding and support system 8' according to the invention allows the second sliding leaf 2 to be mounted on the second fixed part 3 of the screen door 1. The two guiding and support systems 8 and 8' according to the invention are symmetrical in mirror-fashion. The first guiding and support system 8 according to the invention comprises a rail 11 and a rail support 20. The second guiding and support system 8' according to the invention comprises a second rail 12 and a second rail support 30. The rails 11 and 12 are, here, identical and the rail supports 20, 30 are symmetrical in mirror-fashion. Hereinbelow, only the first guiding and support system 8 according to the invention will be described, the description applying mutatis mutandis to the second guiding and support system 8' according to the invention.

Referring to FIGS. 5 to 8, the rail is an extruded section and is preferably fixed onto the sliding leaf 2. In cross section, the rail 11 is, as illustrated here, overall of rectangular form. As a variant, other forms are possible. Therefore, here, it comprises a top wall 115, an outer sidewall (on the right in FIG. 7) connected to the top wall 115. The rail 11 comprises a bottom wall 118 connected on a side edge to the outer sidewall 116. The bottom wall 118 comprises a bottom bearing surface 1181 and a top bearing surface 1182. The rail 11 further comprises an inner sidewall 117 (on the left in FIG. 7) connected by a top edge to the top wall 115. The inner sidewall 117 extends vertically only over a top part of a height of the section of the rail 11. Since the inner sidewall 117 and bottom wall 118 are not directly connected to one another, they define a longitudinal opening making it possible to interface the rail 11 with a rail support 20.

The rail support 20 comprises a plate 23 forming a base that makes it possible to fix the rail support 20 onto the platform edge coping. It comprises a first post 22 fixed onto the plate 23 and extending by protruding therefrom vertically. On one side of the first post 22, the rail support comprises a main roller 221 mounted free to rotate on the first post 22 on an axis of rotation at right angles to a plane of the sliding leaf 2, here horizontal. Also, the first post 22 comprises, at a top, a first pair of rollers 225 mounted to be rotationally mobile on the first post 22 according to a vertical axis of rotation. The first pair of rollers 225 is positioned at the level of the main roller 221, line therewith, here. When the rail 11 is positioned in the rail support 20, the bottom bearing surface 1181 of the bottom wall 118 of the rail 11 comes to bear on the main roller 221. At the same time, the inner sidewall 117 is received between the two rollers 225 of the first pair of rollers 225.

The rail support 20 comprises a second post 21 fixed onto the plate 23, at a distance from the first post 22, and extending by protruding therefrom vertically. On one side of the second post 21, the rail support comprises first 211 and second 212 secondary rollers mounted free to rotate on the second post 21 on an axis of rotation at right angles to a plane of the sliding leaf 2, here horizontal. The second secondary roller 212 is positioned at a distance, vertically, from the first secondary roller 211 such that a distance e between a high point of a rolling surface of the first roller 211 and a low point of a rolling surface of the second secondary roller 212 is equivalent to a thickness of the bottom wall 118 of the rail 11, with a functional clearance. Thus, when the rail 11 is positioned in the rail support 20, the top bearing surface 1182 of the bottom wall 118 of the rail 11 comes to bear on the second secondary roller 212, and the bottom bearing surface 1181 of the bottom wall 118 of the rail 11 comes to bear on the first secondary roller 211. Also, horizontally, the second secondary roller 212 is offset from the first secondary roller 211 such that the second secondary roller 212 is located between the first secondary roller 211 and the main roller 221 in a direction of movement of the rail 11. Also, the first 211 and the second 212 secondary rollers are, here, in one and the same plane as the main roller 221. As a variant, they are in different but parallel planes. Furthermore, the second post 21 comprises, at a top, a second pair of rollers 215 mounted to be rotationally mobile on the second post 21 according to a vertical axis of rotation. The second pair of rollers 215 is positioned at the level of one of the first 211 and second 212 secondary rollers, in line therewith, here. In the present case illustrated in the figures, the second pair of rollers 215 is positioned in line with the first secondary roller 211. When the rail 11 is positioned in the rail support 20, the inner sidewall 117 is received between the two rollers 215 of the second pair of rollers 215. Obviously, the first pair of rollers 225 is aligned with the second pair of rollers 215.

Thus, a first set of rollers is formed by the main roller 221 and the first 211 and second 212 secondary rollers. The prime role of this set of rollers is to support the sliding leaf 2 and to guide it during its transitions from the closed position to the open position and vice versa. The main roller 221 supports twice the weight of the sliding leaf 2: to this end, it has a diameter greater than a diameter of the secondary rollers 211, 212. The secondary rollers 211, 212 ensure that the sliding leaf 2 does not tilt in its plane regardless of the position that it occupies.

Similarly, a second set of rollers is formed by the first 225 and second 215 pairs of rollers. The prime role of this second set of rollers is to laterally guide, in a horizontal direction at right angles to the direction of the horizontal translational movement of the sliding leaf 2, the rail 11 fixed to the sliding leaf 2. That makes it possible to take up the loads due to the pumping effect and to crowd thrust, or even wind thrust, which are applied to the sliding leaf 2.

In the screen door 1 according to the invention, the rail support is positioned in the fixed part 3 associated with the sliding leaf 2 that the guiding and support system 8 according to the invention links, such that:

the first post 22 is on the side of the opening adjacent to the fixed part 3 of the screen door 1 according to the invention;

the second post 21 is on the side of the fixed part 3, opposite the adjacent opening, that is to say on the side of the emergency door 4, in the case illustrated here.

The guiding and support system 8 according to the invention as has just been described comprises fewer moving parts since the number of rollers has been reduced, in particular for the first set of rollers. In addition, none of the parts involved in the guiding and the support of the sliding leaf 2 rubs with the rail 11: there are only bearings. Thus, the servicing costs are minimized, and the mechanical efficiency is close to 1, which generates energy savings.

According to a variant embodiment, the rollers of the first 225 and second 215 pairs of rollers can be replaced by friction skids, for example made of PTFE (polytetrafluoroethylene).

In one embodiment, the main roller 221 can be replaced by two smaller rollers, for example similar to the rollers 211 and 212. That makes it possible to standardize all of the rollers used: which simplifies the manufacturing and maintenance.

According to another embodiment, an additional roller 2214 can be associated with the main roller 221 on the first post 22. In this case, the two main 221 and additional rollers are positioned on the first post 22 in a way similar or symmetrical to the positioning of the two secondary rollers 211 and 212 on the second post 21. That makes it possible to prevent a tilting, in its plane, of the leaf in open position in some situations.

In one embodiment, the main 221 and secondary 211 and 212 rollers (as well as the possible additional roller) are chevron-shaped rollers, rolling on a rounded rolling track formed on the surfaces 1181 and 1182 of the rail 11. That allows for a self-centering of the leaf 2 on said rollers.

In another embodiment, the main 221 and secondary 211 and 212 rollers (as well as the possible additional roller) can be adjusted in position, particularly according to their axes of rotation, in order to allow an adjustment of the verticality of the leaf 2 as well as the alignment thereof in relation to the other leaf 2 of the screen door 1.

Figure 9:
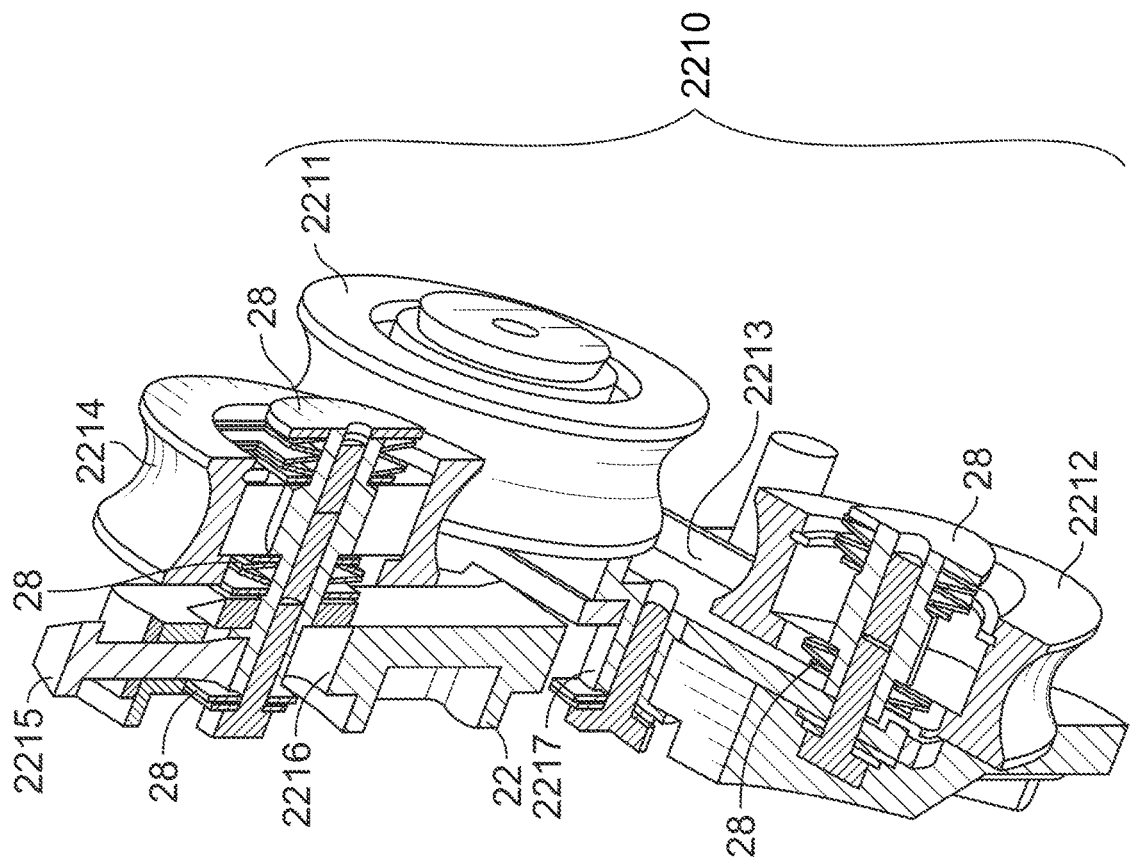
FIG. 9 is a three-dimensional cross-sectional view of the sets of rollers according to a second embodiment of a guiding and support system according to the invention.
Figure 9:
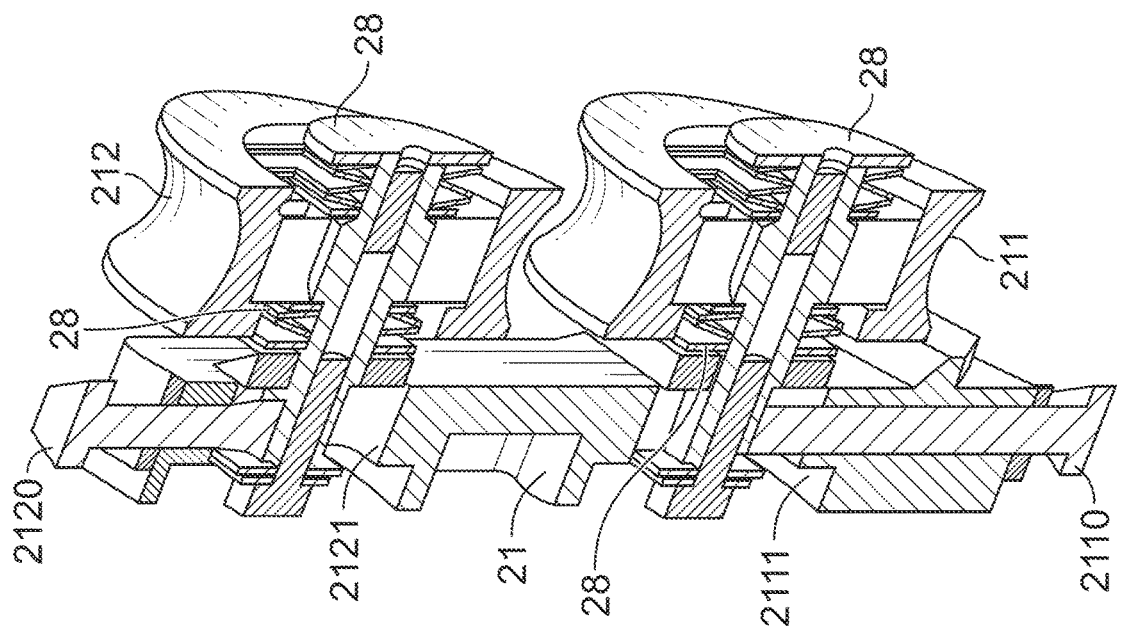
Figure 10:
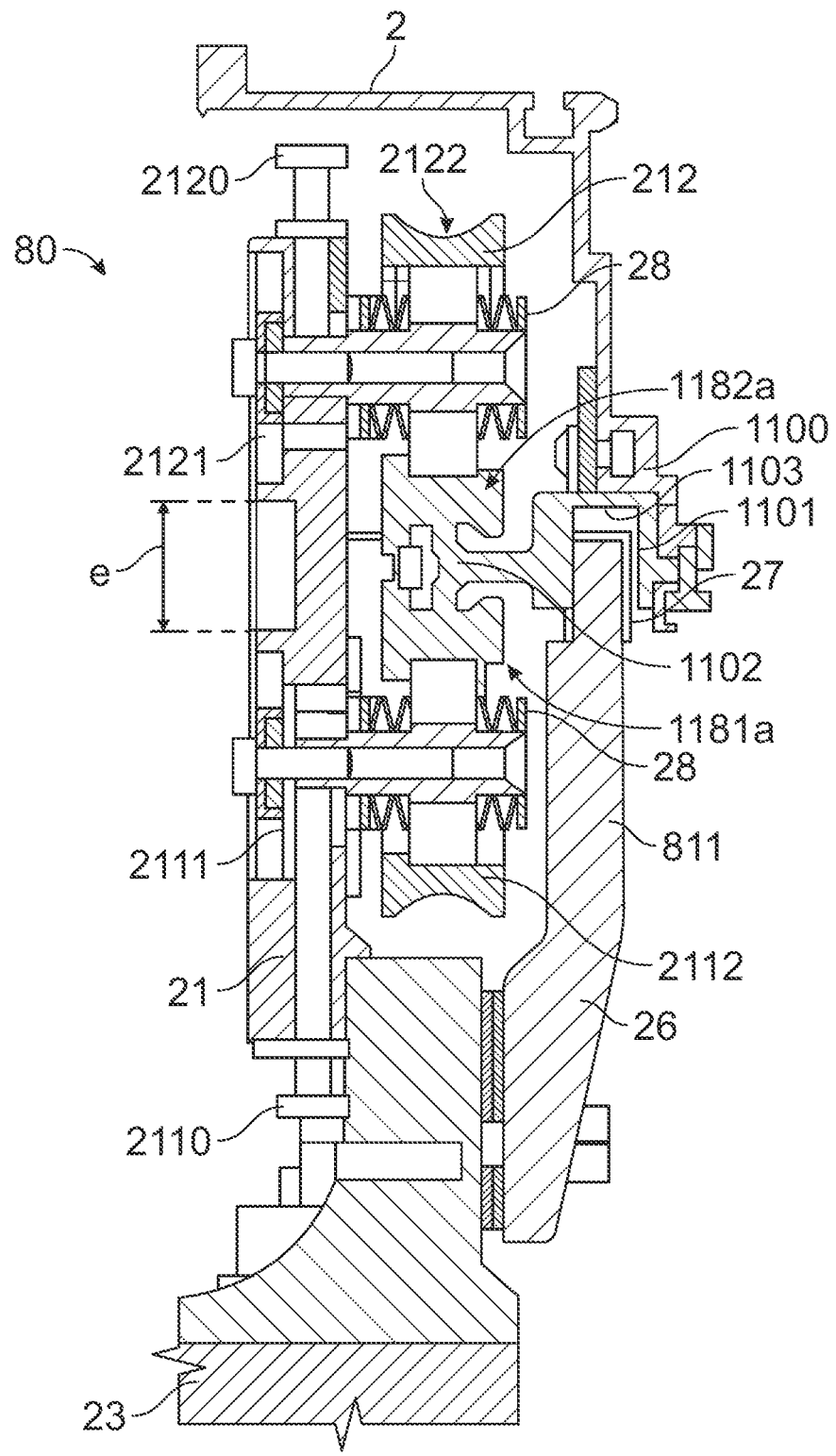
FIG. 10 is a partial cross-sectional view at the level of the set of secondary rollers of the second embodiment of a support and guiding system according to the invention.

As an example, the four preceding embodiments are illustrated concomitantly in a second embodiment of a support and guiding system 80 according to the invention which will now be described with reference to FIGS. 9 and 10.

The first set of rollers 2210, 211 and 212 of the support and guiding system 80 will be described first. It comprises a main roller 2210 and first 211 and second 212 secondary rollers. The main roller 2210 here comprises two rollers 2211 and 2212 positioned one behind the other in the direction of movement of the rail 1100. The two rollers 2211 and 2212 are identical. In addition, preferentially but optionally, they are similar to the secondary rollers 211 and 212 in size and/or in shape. Also, the two rollers 2211 and 2212 are mounted, at least rotationally mobile about their own axis, on a link plate 2213. This link plate 2213 is itself mounted to be rotationally mobile on the first post 22. That makes it possible to ensure a contact with the rail 1100 regardless of the orientation thereof in relation to the first post 22, and thus ensure an optimal distribution of the loads of the leaf 2 on the two rollers 2211 and 2212, regardless of the positioning of the rail 1100 and therefore the leaf 2 in relation to the first post 22.

Also, illustrated here, the first set of rollers further comprises an additional roller 2214 associated with the main roller 2210 on the first post 22. The two main 2210 and additional 2214 rollers are positioned on the first post 22 in a way similar or symmetrical to the positioning of the two secondary rollers 211 and 212 on the second post 21. In particular, according to the embodiment illustrated in FIG. 9, the additional roller 2214 is situated on the vertical to the axis of rotation of the link plate 2213 of the main roller 2210. That makes it possible to prevent a tilting, in its plane, of the leaf in open position in some situations.

The support and guiding system 80 according to the present invention includes a rail 1100 of extruded section and fixed type, when mounted on the leaf 2. The rail 1100 includes a first zone 1102 which is intended to cooperate with the first set of rollers 211, 212, 2210, 2214. For that, the rail 1100 includes, in the first zone 1102, a rolling track formed on the top surface 1182a of convex form, here in the form of a circular arc. The rail 1100 further includes a rolling track formed on the bottom surface 1181a also of convex form, here, once again, in the form of a circular arc. The rolling tracks formed on the top surface 1182a and formed on the bottom surface 1181a are, here, symmetrical and mirroring one another.

In a particular embodiment, the rolling tracks formed respectively on the top 1182a and bottom 1181a surfaces of the guiding rail 1100 are inscribed in a circle, so as to produce, in operation, a pivot function with the rollers: thus, a defect of verticality of the leaf 2 generates no load in the rollers.

Also, the rail 1100 comprises a second zone 1101, adjacent to the first zone 1102, in which:
the rail 1100 is fixed to the leaf 2
the rail 1100 comprises a runner 1103 in the form of an inverted "U", the runner 1103 extending parallel along a longitudinal axis of the rail 1100.

The runner 1103, upon installation, is intended to slidingly receive, between the branches of the "U", abutment-forming means 27 situated, here, at a free end of a transmission part 26 fixed to the second post 21, at the level of a base thereof in the vicinity of the plate 23. A transmission part 26 is also provided similarly on the first post 22. In both cases, the free end bearing the abutment-forming means 27 extends facing and at a distance from the main roller 2210 and the first secondary roller 211 respectively. An operating clearance is provided between the abutment-forming means 27 and the branches of the "U" so as to allow a limited relative movement of the abutment-forming means 27 in a lateral direction within the runner 1103.

Also, the various rollers 211, 212, 2211, 2212 and 2214 are, here, chevron-shaped rollers. In fact, as illustrated in FIG. 10, a rolling surface 2112 of the secondary roller 211 has a concave shape in section which takes the form of a chevron. The same applies for a rolling surface 2122 of the other secondary roller 212. These rolling surfaces 2112 and 2122, in operation of the support and guiding system 80 according to the present invention, come to bear and roll on rounded rolling tracks respectively formed on the surfaces 1181a and 1182a of the rail 1100. That allows for a self-centering of the leaf 2 on the rollers as well as the possibility of transmitting lateral loads from the leaf 2 to the posts 21 and 22.

The various rollers of the first set of rollers are, each, mounted to be rotationally mobile on their associated post 21 or 22 and to be mobile with limited translation along their axis of rotation. These translational movements along the axis of rotation of the rollers are performed against elastic limiting means 28. These elastic limiting means 28 here are stacks of Belleville spring washers, two adjacent Belleville spring washers being positioned in mirror-fashion one against the other. Furthermore, in the embodiment illustrated in FIGS. 9 and 10, a similar stack of Belleville spring washers is positioned on either side of each of the rollers. Thus, for each of the rollers 211, 212, 2211, 2212 and 2214, there are two stacks of Belleville spring washers for each roller axis. Such a system constitutes a spring casing. Each stack 28 of Belleville spring washers behaves like a calibrated spring.

Thus, when the leaf 2 undergoes a lateral load, for example following a gust of wind, a crowd thrust or a pumping effect dur to the passage of the train, the latter generates a lateral movement of the leaf 2. The lateral load is transmitted to the rail 1100 fixed to the leaf 2. Because of the shape of the rolling surfaces of the rollers of the first set of rollers cooperating with the convex rolling tracks 1181 and 1182 of the rail 1100, the lateral load is transmitted to the rollers which are moved translationally according to their axis of rotation against the elastic limiting means 28 as long as the induced lateral movement remains less than the operating clearance between the abutment-forming means 27 and the branches of the "U" shape of the runner 1103. The lateral load is transmitted to the posts 21 and 22.

Also, because each stack 28 behaves like a calibrated spring, as long as the lateral load which tends to generate a lateral movement does not exceed the calibration value of the stacks 28, there is no lateral movement and the abutment-forming means 27 serve no purpose. If the lateral load increases, the calibration force is exceeded, the Belleville spring washers are crushed, the rollers slide on their axis, and the leaf is moved laterally until the abutment-forming means 27 come to bear against one of the branches of the "U" shape of the runner 1103.

If the lateral load is such that the lateral movement induced is greater than the above operating clearance, then the abutment-forming means 27 come to bear against one of the branches of the "U" shape of the runner 1103: a portion of the lateral load is transmitted to the posts 21 and 22 via the rollers and the elastic limiting means 28, the other portion of the lateral load is transmitted to the posts 21 and 22 via the abutment-forming means 27 and the transmission part 26. Such a structure makes it possible to protect the first set of rollers from a significant lateral load. In addition, such a structure makes it possible to also produce a lateral guidance of the leaf 2 in a movement thereof, which replaces the second set of rollers formed by the rollers of the first 225 and second 215 pairs of rollers of the embodiment previously described of the support and guiding system 8, 8' according to the invention.

Also, the various rollers 2210, 2214, 211 and 212 of the first set of rollers can be adjusted in terms of position, particularly in terms of height. For that, the axis of the rollers 211, 212, 2210 and 2214 is received respectively in an oblong opening, here vertical, 2111, 2121, 2217 and 2216 formed in a thickness of the associated post 21, 22. Means 2110, 2120, 2215 for adjusting the position in the oblong opening are provided for this purpose. Here, the position adjustment means are bolts screwed into the thickness of the posts 21, 22 and of which one end emerges in the oblong opening at right angles to the axis of the rollers and comes to bear against the latter.

In another variant embodiment, the guiding and support system 8 is backed up, in a top part of the fixed part 3 and of the leaf 2, by a complementary guiding system comprising a rail and sets of rollers/skids similar in structure to the second set of rollers/skids 215, 225. That makes it possible to reinforce the resistance to the lateral loads that the leaf 2 can be subjected to because of the wind, the pumping effect or crowd thrust.

Figure 3:
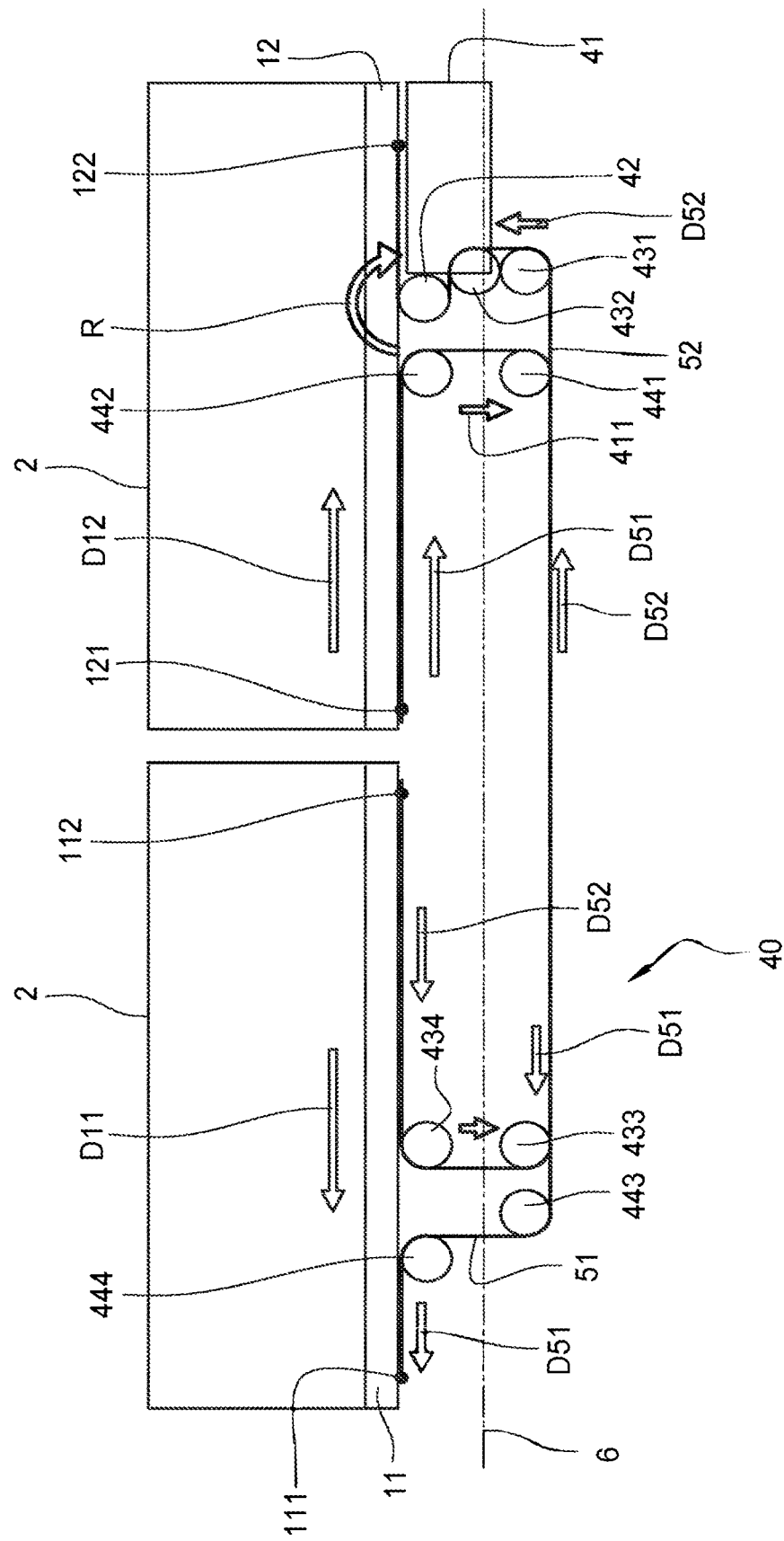
FIG. 3 is a schematic view of the motor drive mechanism of FIG. 2.
Figure 4:
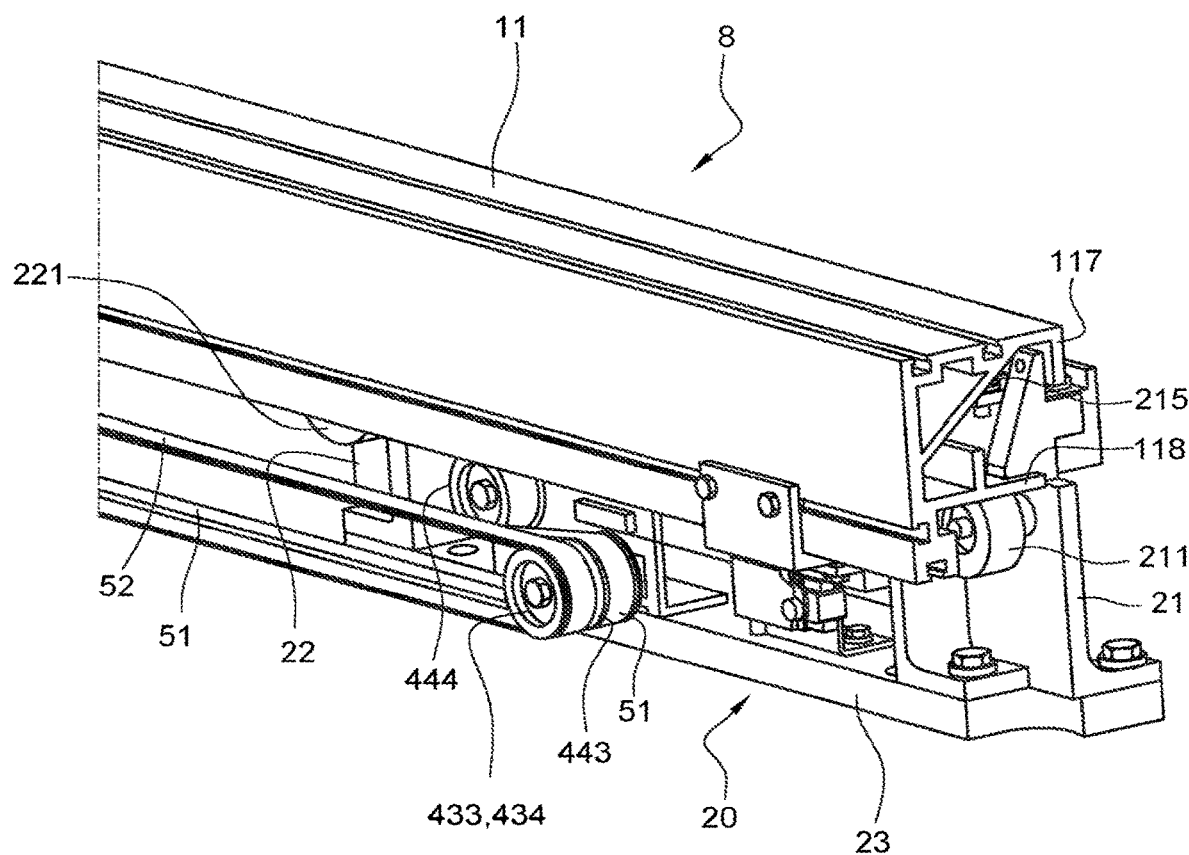
FIG. 4 is a partial three-dimensional view of an end of the system of FIG. 2.
Figure 5:
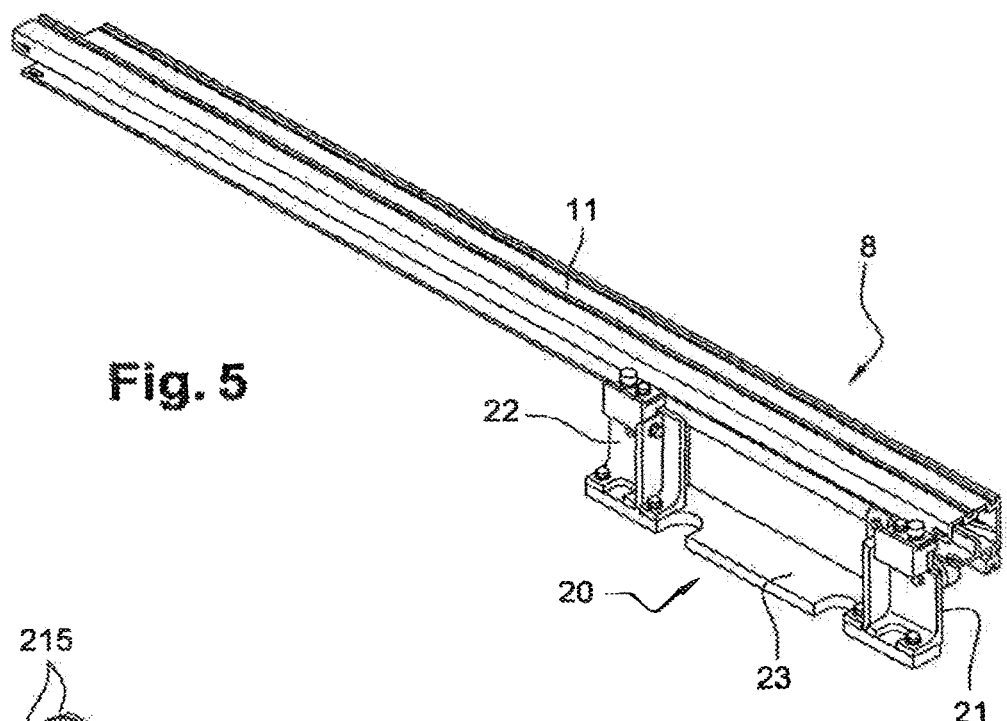
FIG. 5 is a three-dimensional view of the guiding and support system according to the invention.
Figure 6:
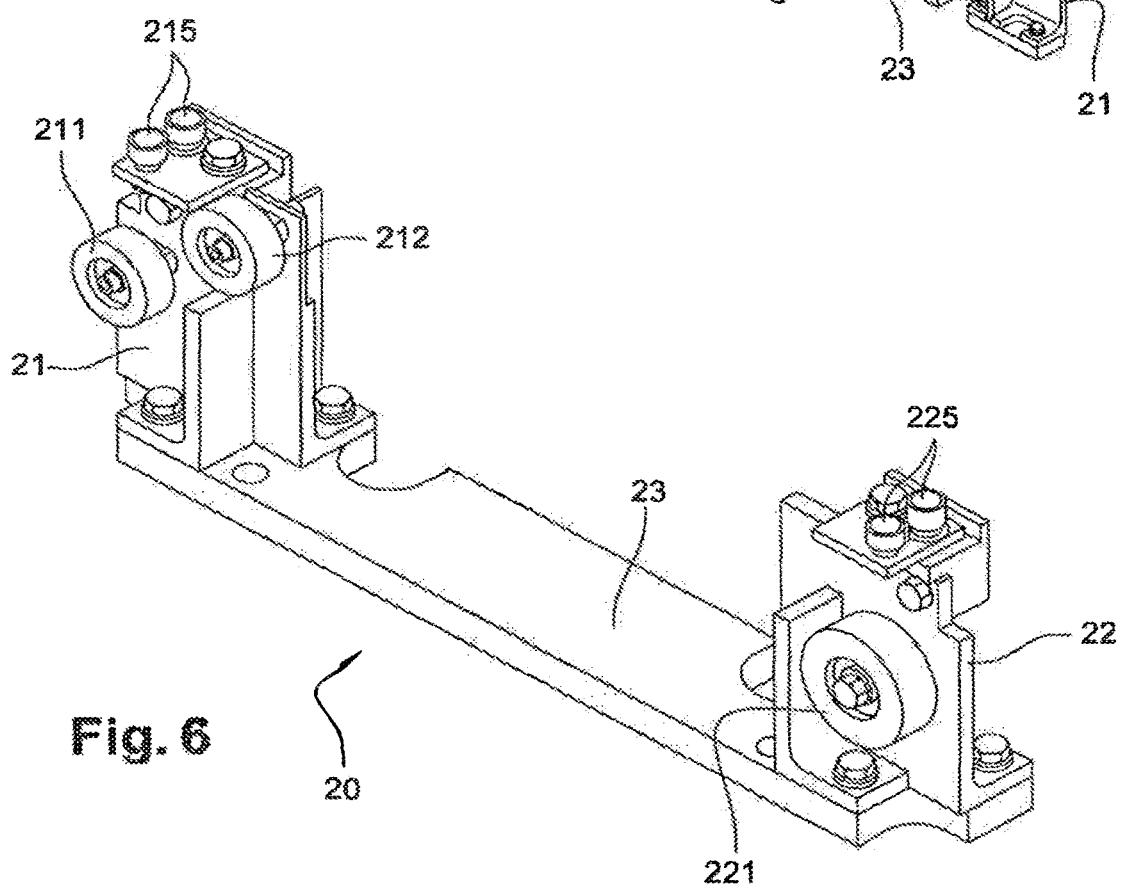
FIG. 6 is a three-dimensional view of the sets of rollers of the system of FIGS. 2 and 5.
Figure 8:
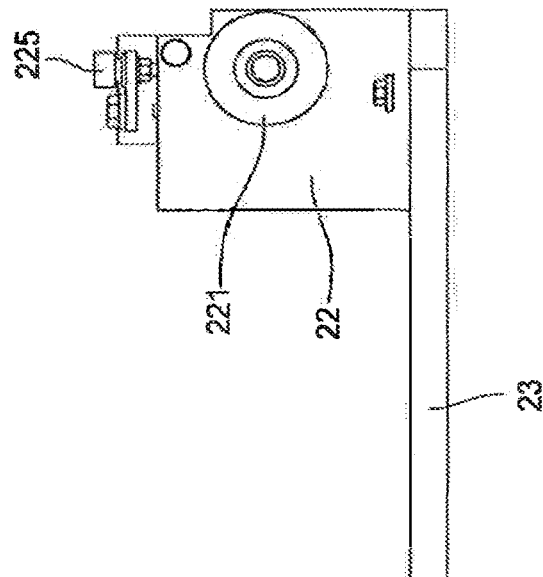
FIG. 8 is a front view of the sets of rollers of FIG. 6.
Figure 7:
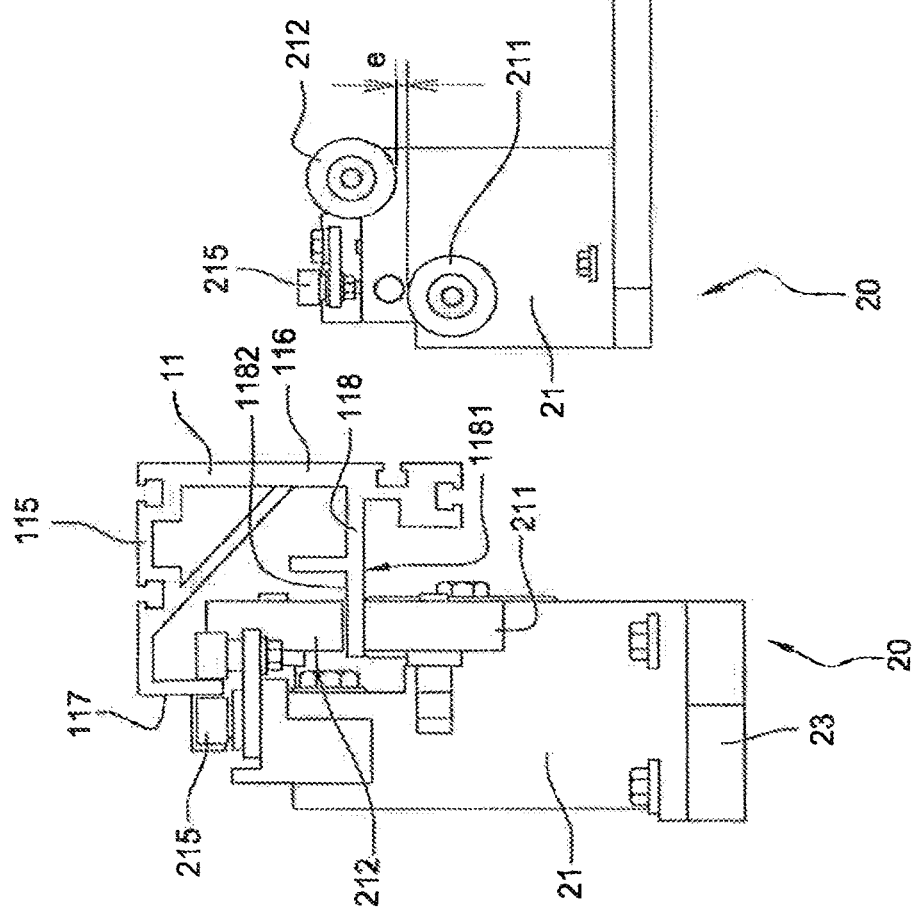
FIG. 7 is a side view of the system of FIG. 5.

There now follows a description, referring to FIGS. 2 to 4, of a driving mechanism 40 making it possible to move the sliding leaves 2 of the screen door 1 according to the invention in a synchronized manner.

The driving mechanism 40 comprises a driving motor 41. It is positioned, here, between the posts of the rail support 30, under the rail 12. It drives a motor pulley 42 in rotation. The driving mechanism comprises a first 51 and a second 52 flexible elongate driving element. The flexible elongate driving elements 51 and 52 can be belts, cables or even chains. The flexible elongate driving elements 51, 52 are mounted crosswise, the driving motor 41 directly driving only one 52 of the flexible elongate driving elements 51, 52.

The first flexible elongate driving element 51 is fixed, at a first end 111, e.g. a left end of the first rail 11 and, at a second end 121, e.g. a left end of the second rail 12. Return pulleys 441, 442, 443, 444 make it possible to tighten and define a run for the first flexible elongate driving element 51, particularly partly under the door threshold 6 so as to run the first flexible elongate driving element 51 under the opening adjacent to the fixed parts 3 of the screen door 1 according to the invention. For that, two return pulleys 443 and 444 are situated at the first fixed part 3 and two return pulleys 441, 442 are situated at the second fixed part 3, as is illustrated in FIG. 3. In a variant embodiment, the return pulleys 441 and 442 can be one and the same return pulley. Each pair of pulleys 443, 444 and 441 and 442 can be offset relative to one another in a horizontal direction, as is illustrated for example in FIG. 4 for the pair of pulleys 443, 444.

Similarly, the second flexible elongate driving element 52 is fixed, at a first end 112, e.g. a right end of the first rail 11 and, at a second end 122, e.g. a right end of the second rail 12. Once again, return pulleys 431, 432, 433, 434 make it possible to tighten and define a run for the second flexible elongate driving element 52, in particular partly under the door threshold 6 so as to run the second flexible elongate driving element 52 under the opening adjacent to the fixed parts 3 of the screen door 1 according to the invention. For that, two return pulleys 433 and 434 are situated at the first fixed part 3 and two return pulleys 431, 432 are situated at the second fixed part 3, as is illustrated in FIG. 3. In a variant embodiment, the return pulleys 433 and 434 can be one and the same return pulley, as is illustrated in FIG. 4. In another variant embodiment, the pulleys 431 and 432 can be one and the same return pulley. Each pair of pulleys 433, 434 and 431 and 432 can be offset relative to one another in a horizontal direction.

In addition, here, the second flexible elongate driving element 52 cooperates with the motor pulley 42 to be driven by the driving motor 41.

The two flexible elongate driving elements 51, 52 are positioned and run side by side, the set of the return pulleys 431, 432, 433, 434 being axially offset to the set of the return pulleys 441, 442, 443, 444. Thus, it is possible to mount pulleys of both sets on one and the same axis, as is illustrated in FIG. 4 for the pulleys 433/434 and 443. In addition, since there are only two flexible elongate driving elements 51, 52 which run side by side in the threshold 6, the section of the threshold 6 is consequently very small, and therefore its bulk in the civil engineering work is also very small: that simplifies the preparation of the civil engineering work at the platform edge coping and the installation of the complete screen door 1 module.

In operation, that will be illustrated for the transition from a closed position to an open position of the sliding leaves 2 with reference to FIG. 3, the motor pulley 42 driven by the driving motor 41 by a rotational movement R meshes with the second flexible elongate driving element 52 which is then moved according to a movement D52. This movement D52 of the second flexible elongate driving element 52 has the effect of pulling on the end 112 of the second flexible elongate driving element 52. That then drives the first rail 11 in a movement D11 and consequently the end 111 of the first flexible elongate driving element 51. The latter then performs a movement D51 along its run which has the result of pulling on the end 121 of the first flexible elongate driving element 51. Consequently, the second rail 12 is set in motion according to a movement D12, opposite and symmetrical to the movement D11 of the first rail 11. The second rail 12 then drives, in its movement D12, the end 122 of the second flexible elongate driving element 52, thus looping a driving loop formed in succession by the second flexible elongate driving element 52, the first rail 11, the first flexible elongate driving element 51 and the second rail 12.

Thus, very simply, the two sliding leaves 2 are set in motion between their opening and closing positions by a single driving motor 41, while ensuring a perfect synchronization between the two sliding leaves 2. That avoids the use of two motor drive systems and two control systems (one for each leaf).

A variant embodiment of the driving mechanism 40 is illustrated and described in the document CN203361842U to which reference can be made for more comprehensive information, if necessary.

Obviously, it is possible to apply numerous modifications to the invention without in any way departing from the scope thereof.

The invention claimed is:

1. A guiding and support system for a leaf of a platform screen door, the leaf being able to be moved in relation to a fixed panel of the platform screen door by a horizontal translational movement of the leaf in a plane of the leaf between open and closed positions in which the leaf at least partly frees or blocks an opening adjacent to the fixed panel, comprising:
    a rail extending in a horizontal direction parallel to the plane of the leaf;
    a first post disposed at a first location along a length of the rail with a main roller assembly coupled with the first post and cooperating with the rail to guide the leaf and support the leaf during the horizontal translational movement, the main roller assembly comprising:
        at least two rollers in contact with a bottom bearing surface of the rail; and
        an additional roller cooperating with the at least two rollers, the additional roller in contact with a top bearing surface of the rail, wherein an axis of rotation of the additional roller is vertically offset from and between axes of rotation of the at least two rollers, the at least two rollers and the additional roller being mounted on the first post, wherein the at least two rollers and the additional roller are mounted on a side of the first post facing in a direction generally perpendicular to the plane of the leaf; and
    a second post disposed at a second location along the length of the rail, the second post separated from the first post by a distance between the first and second posts, the first and second posts extending in a vertical direction that is general parallel to the plane of the leaf, the second post including first and second secondary rollers mounted on a side of the second post facing the direction generally perpendicular to the plane of the leaf, the first and second secondary rollers are vertically offset relative to one another and are in contact respectively with the bottom bearing surface of the rail and the top bearing surface of the rail, the first and second secondary rollers being spaced apart from the main roller assembly along the horizontal direction.

2. The system according to claim 1, wherein the second secondary roller is horizontally offset from the first secondary roller.

3. The system according to claim 1, wherein the at least two rollers of the main roller assembly are positioned one behind another in the horizontal direction.

4. The system according to claim 1, wherein the bottom bearing surface and the top bearing surface each comprises a rolling track defining a circular arc, wherein the at least two rollers and the additional roller of the main roller assembly are configured to pivot relative to the rail.

5. The system according to claim 1, wherein the rollers of the main roller assembly are movable along a respective one of the axes of rotation of the rollers of the main roller assembly.

6. A platform screen door comprising:
a threshold;
a fixed panel and a leaf that can be moved in relation to the fixed panel by a horizontal translational movement of the leaf in a plane of the leaf between open and closed positions in which the leaf at least partly frees or blocks an opening adjacent to the fixed panel; and
a guiding and support system for the leaf, wherein the guiding and support system comprises:
a rail extending in a horizontal direction parallel to the plane of the leaf;
a first post disposed at a first location along a length of the rail with a main roller assembly coupled with the first post and cooperating with the rail to guide the leaf and support the leaf during the horizontal translational movement, the main roller assembly comprising at least two rollers in contact with a bottom bearing surface of the rail and an additional roller in contact with a top bearing surface of the rail, wherein an axis of rotation of the additional roller is vertically offset from and between axes of rotation of the at least two rollers, wherein the at least two rollers and the additional roller are mounted on a side of the first post facing in a direction generally perpendicular to the plane of the leaf; and
a second post disposed at a second location along the length of the rail, the first and second posts extending in a vertical direction that is generally parallel to the plane of the leaf, the second post including first and second secondary rollers mounted on a side of the second post facing in the direction generally perpendicular to the plane of the leaf, the first and second secondary rollers are vertically offset relative to one another and are in contact respectively with the bottom bearing surface of the rail and the top bearing surface of the rail, the first and second secondary rollers being spaced from the main roller assembly along the horizontal direction.

7. The screen door according to claim 6, wherein the rail is secured to the leaf and the main roller assembly and the secondary rollers are secured to the fixed panel.

8. The screen door according to claim 6, wherein the guiding and support system is adjacent the threshold.

9. The screen door according to claim 6, wherein the fixed panel is a first fixed panel, and further comprising:
a second fixed panel, separated from the first fixed panel;
a second leaf that can be moved in relation to the second fixed panel by a second horizontal translational movement of the second leaf in a plane of the second leaf between second open and second closed positions in which the second leaf partly frees or blocks a second opening, the second horizontal translational movement of the second leaf being symmetrical to the horizontal translational movement of the first leaf, and
a second guiding and support system for the second leaf, wherein the second guiding and support system comprises:
a second rail extending in a horizontal direction parallel to the plane of the second leaf;
a third post disposed at a third location along a length of the second rail with a second main roller assembly coupled with the third post and cooperating with the second rail to guide the second leaf and support the second leaf during the second horizontal translational movement; and
a fourth post disposed at a fourth location along the length of the second rail, the third and fourth posts extend vertically generally parallel to the plane of the second leaf, the fourth post including third and fourth secondary rollers, the third and fourth secondary rollers are vertically offset relative to one another and are in contact respectively with a bottom bearing surface of the second rail and a top bearing surface of the second rail, the third and fourth secondary rollers being spaced apart from the second main roller assembly.

10. The screen door according to claim 9, wherein the second main roller assembly comprises at least two second rollers in contact with the bottom bearing surface of the second rail and a second additional roller in contact with the top bearing surface of the second rail.

11. The screen door according to claim 6, further comprising a plate attached to a platform, wherein the first post and the second post are attached to the plate.

* * * * *